(Model.)

L. A. ASPINWALL.
POTATO DIGGER.

No. 264,603. Patented Sept. 19, 1882.

Witnesses
Harold Serrell
Chas. H. Smith

Inventor
Lewis A. Aspinwall
per Lemuel W. Serrell
Atty

United States Patent Office.

LEWIS A. ASPINWALL, OF LOUDONVILLE, NEW YORK.

POTATO-DIGGER.

SPECIFICATION forming part of Letters Patent No. 264,603, dated September 19, 1882.

Application filed December 29, 1880. (Model.)

*To all whom it may concern:*

Be it known that I, LEWIS AUGUSTUS ASPINWALL, of Loudonville, in the county of Albany and State of New York, have invented an Improvement in Potato-Diggers, of which the following is a specification.

In my United States Patent No. 224,123, based upon my English Patent No. 4,470, granted November 5, 1878, I have shown a revolving separator provided with offsets or steps in an approximately helical direction to act upon the potatoes as raised from the ground by a plow and throw them out upon the ground.

My present invention is an improvement upon the foregoing invention; and it consists in the combination, with the plow, of a revolving separator provided with offsets or steps and fingers that are each in the form of an open helix, and serve to turn the potatoes out of the earth and press them toward the right of the driver and roll them over, so that the earth will fall off, and at the same time be spread, broken up, and leveled sufficiently to allow the potatoes to be free and clear upon the surface; and I combine with the plow and separator a top and weed turner that lays the portions that are above ground forward and downward in advance of the potato-separator, so that the tops and weeds will be buried or laid down and not fall upon and cover the potatoes.

Figure 1:
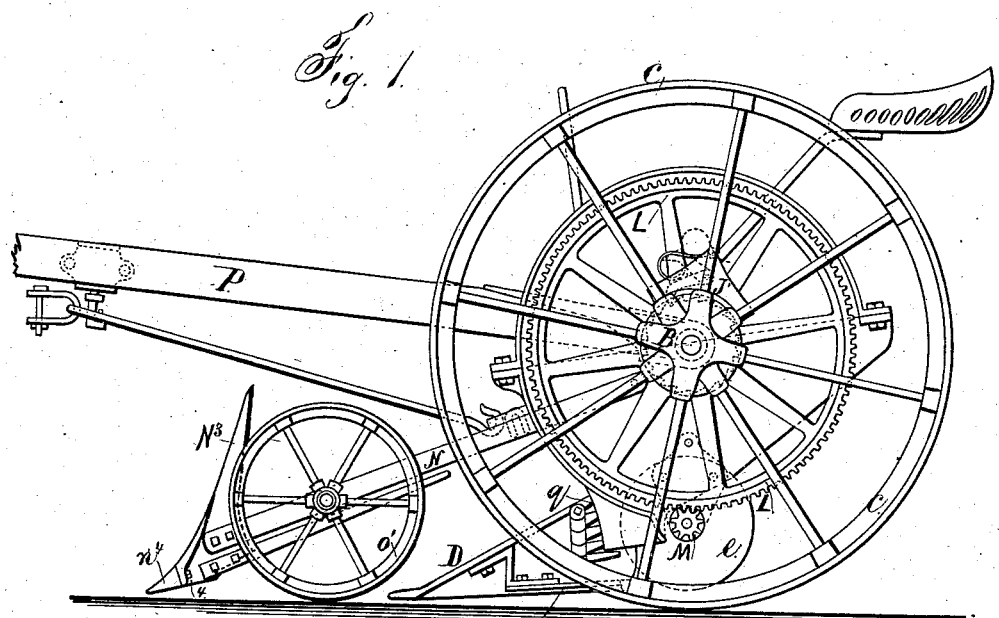
Figure 2:
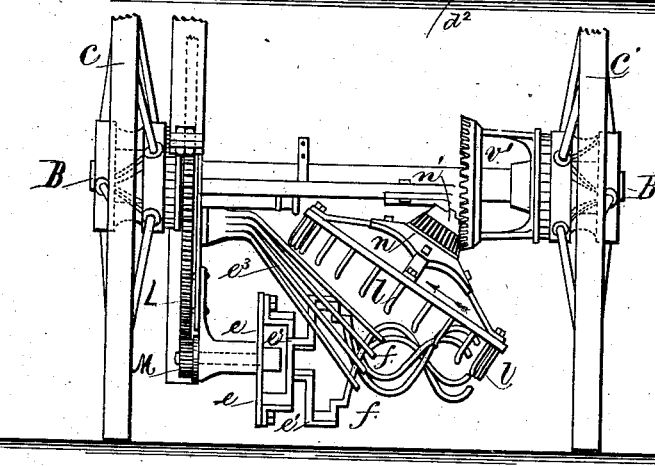
Figure 3:
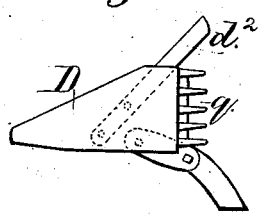

In the drawings, Figure 1 is a side elevation of my potato-digger. Fig. 2 is a rear view of the same, showing especially the separator, top-turner, and deflecting-fingers; and Fig. 3 is a plan of the plow.

The wheels C C', shaft B, tongue P, wheel $o'$, and its bar N are substantially the same as in my aforesaid patent. The dividing-bar $N^3$ is also similar; but it is provided with a conical chilled-iron point, $n^4$, that is secured to the bar $N^3$ by the bolt 4. This movable point comes into contact with the earth near the side of the row, and serves to separate the weeds and potato-tops that may be matted together and lay them to the right, and the movable point can be removed and another substituted when necessary.

In my aforesaid patent the plow D had fingers $q$ and rearward blades; but the share was concave and broad. In some kinds of earth this plow is liable to clog and load, and the earth is not freely delivered. To remedy this evil I make the plow narrow or pointed at the front end and broader at the back end, and the left edge of the share is the highest and is at an angle of about thirty degrees with the horizon, and the surface is flat, so that the earth and potatoes are lifted freely and pass over the plow without clogging, and at the same time the under-surface cutter $d^2$, that projects at the right of the share, serves to cut that portion of the hills or earth at the right side, where it is desirable not to elevate the earth, but to partly invert or turn it over, and the helical separator and spreader levels down and loosens the earth and rolls the potatoes over upon the surface until freed from the earth. I also employ deflecting-fingers $e^3$, extending diagonally in the rear and above the helical separator, to divert the potatoes to the right, and thus prevent them falling in the rear of the helical separator, and I assist in placing the tops and weeds out of the way of the potatoes by a revolving top and weed turner, the same being composed of a circular range of fingers $l$, inclined and curved downwardly and backwardly. The said fingers $l$ project from a ring or head, $n$, that revolves upon an inclined axis, $n'$, having a bevel-pinion acted upon by a bevel-gear, $v'$, that projects from and is revolved with the main driving or supporting wheel C'.

As the machine or apparatus is moved along the fields the top or weed clearer revolves in the direction indicated by the arrow, and lays the tops and stems or weeds forwardly and to the right of the driver, so that they will not cover the potatoes by falling upon them; but, on the contrary, the vines will be partially covered with the earth as the potatoes are thrown out. This top-turner may be located farther to the front of the axle of the machine than that shown in the drawings, and placed at a greater or less inclination, the gearing being adapted to drive the top-turner in the proper direction; or an endless chain of fingers may be substituted for the top-turner in its present position.

The separator is revolved by the wheel L and pinion M, as in aforesaid patent, and the disk $e$ has offsets or steps $e'$ in an approximately helical form, the same as heretofore used by me; but the helical fingers $f$ are extended to the right and make two or more convolutions, so that, in revolving, these fingers describe a cylinder, or nearly so, that is of smaller diameter than the disk $e$, and helical offsets or steps $e'$. Hence this separator, as it revolves, acts beneath the earth and potatoes as they are raised by the plow, and the helical offsets $e'$ move the potatoes toward the right, and the helical fingers $f$ do not act in the earth, but above the general level of the surface, to level the earth down into the furrow and at the same time to roll the potatoes over and move them toward the right, so that with the assistance of the top-turners they will be freed from the earth and the earth will be leveled for them to rest upon it. This avoids the difficulty experienced in my former potato-digger of the potatoes being simply separated from the earth, instead of the earth being leveled and the potatoes rolled out upon it.

I am aware that removable points have been applied upon mold-boards of plows; also that top and weed turners have been employed in potato-diggers; also that separators running horizontally, or nearly so, upon a vertical shaft have been used with a plow or shoe to raise the potatoes, and with a revolving rake acting across the row of potatoes. These devices are difficult to operate without their becoming clogged with vines and weeds.

I claim as my invention—

1. In a potato-digger, the combination, with the plow D, wheel $o'$, and dividing-bar $N^3$, of a removable conical chilled-iron point, $n^4$, having an attaching-bolt extending back through the bar $N^3$, substantially as set forth.

2. The combination, in a potato-digger, of a plow, a revolving separator to throw out the potatoes, the deflecting-fingers $e^3$, extending diagonally above and across the separator, and the revolving top and weed turner above the separator and inclined fingers, substantially as set forth.

3. The combination, in a potato-digger, of a plow, a separator upon a horizontal axis across behind the plow, means for revolving the separator, a top and weed turner upon an inclined axis, and gearing to revolve the same above the separator, substantially as set forth.

4. The combination, with the plow and separator in a potato-digger, of an independent top and weed turner beneath the axle and set at an inclination downwardly toward one side, and revolved substantially as set forth, so that the weeds and tops are moved forwardly and downwardly toward the surface of the earth, and the curved fingers drawn out from the same at the back part of such turner, substantially as set forth.

5. In a potato-digger, a revolving separator having offsets $e'$, in an approximately helical form, and open helical fingers that are extended from the offsets and make two or more convolutions, substantially as and for the purposes set forth.

Signed by me this 19th day of November, A. D. 1880.

L. AUGS. ASPINWALL.

Witnesses:
GEO. T. PINCKNEY,
WILLIAM G. MOTT.